US010769017B2

(12) United States Patent
Xu et al.

(10) Patent No.: US 10,769,017 B2
(45) Date of Patent: Sep. 8, 2020

(54) ADAPTIVE MULTI-LEVEL CHECKPOINTING

(71) Applicant: HEWLETT PACKARD ENTERPRISE DEVELOPMENT LP, Houston, TX (US)

(72) Inventors: Cong Xu, Palo Alto, CA (US); Itir Akgun, Palo Alto, CA (US); Paolo Faraboschi, Sant Cugat (ES)

(73) Assignee: Hewlett Packard Enterprise Development LP, Houston, TX (US)

( * ) Notice: Subject to any disclaimer, the term of this patent is extended or adjusted under 35 U.S.C. 154(b) by 179 days.

(21) Appl. No.: 15/960,302

(22) Filed: Apr. 23, 2018

(65) Prior Publication Data
US 2019/0324857 A1    Oct. 24, 2019

(51) Int. Cl.
*G06F 11/00* (2006.01)
*G06F 11/14* (2006.01)
*H04L 29/08* (2006.01)

(52) U.S. Cl.
CPC ...... *G06F 11/1407* (2013.01); *G06F 11/1438* (2013.01); *G06F 11/1451* (2013.01); *G06F 11/1464* (2013.01); *H04L 67/1095* (2013.01); *H04L 67/1097* (2013.01)

(58) Field of Classification Search
CPC ............. H04L 67/1095; H04L 67/1097; G06F 11/1407; G06F 11/1438; G06F 11/1451; G06F 11/1464; G06F 11/1402; G06F 11/1448
See application file for complete search history.

(56) References Cited

U.S. PATENT DOCUMENTS

| | | | |
|---|---|---|---|
| 7,991,744 B2 | 8/2011 | Saha et al. | |
| 8,788,879 B2 | 7/2014 | Blumrich et al. | |
| 9,635,109 B2 | 4/2017 | Iliadis et al. | |
| 9,652,568 B1 | 5/2017 | Tzelnic et al. | |
| 9,916,311 B1* | 3/2018 | Bent | G06F 16/13 |
| 10,157,003 B1* | 12/2018 | Faibish | G06F 3/0619 |
| 2007/0220327 A1 | 9/2007 | Ruscio et al. | |
| 2011/0289345 A1* | 11/2011 | Agesen | G06F 11/2097 714/4.11 |
| 2015/0293845 A1* | 10/2015 | Hsu | G06F 12/0811 711/122 |
| 2019/0196920 A1* | 6/2019 | Andrade Costa | G06F 11/1471 |

OTHER PUBLICATIONS

Moody et al., "Design, Modeling, and Evaluation of a Scalable Multi-level Checkpointing System," 2010 ACM/IEEE International Conference for High Performance Computing, Networking, Storage and Analysis, SC10 Nov. 2010, 11 pages.

(Continued)

*Primary Examiner* — Joseph D Manoskey
(74) *Attorney, Agent, or Firm* — Mannava & Kang, P.C.

(57) ABSTRACT

In some examples, with respect to adaptive multi-level checkpointing, a transfer parameter associated with transfer of checkpoint data from a node-local storage to a parallel file system may be ascertained for the checkpoint data stored in the node-local storage. The transfer parameter may be compared to a specified transfer parameter threshold. A determination may be made, based on the comparison of the transfer parameter to the specified transfer parameter threshold, as to whether to transfer the checkpoint data from the node-local storage to the parallel file system.

18 Claims, 8 Drawing Sheets

(56) References Cited

OTHER PUBLICATIONS

Rajachandrasekar et al., "A 1 PB/s file system to checkpoint three million MPI tasks", In Proceedings of the 22nd international symposium on High-performance parallel and distributed computing (HPDC '13), Jun. 17-21, 2013, 12 pages.
Di, S. et al., "Optimization of a Multilevel Checkpoint Model with Uncertain Execution Scales", Nov. 16-21, 2014, SC14: International Conference for High Performance Computing, Networking, Storage and Analysis, pp. 907-918. https://dl.acm.org/citation.cfm?id=2683692.
Jangjaimon, I., "Effective Checkpointing for Networked Multicore Systems and Cloud Computing", 2013, Published by ProQuest LLC, 115 pages. https://search.proquest.com/docview/1524020751?pq-origsite=gscholar.
Li, H. et al., "Two-level Incremental Checkpoint Recovery Scheme for Reducing System Total Overheads", Aug. 11, 2014, 23 pages. https://www.ncbi.nlm.nih.gov/pmc/articles/PMC4128665.
Wan, L. et al., "Optimizing Checkpoint Data Placement with Guaranteed Burst Buffer Endurance in Large-scale Hierarchical Storage Systems", Feb. 2017, pp. 16-29. http://www.sciencedirect.com/science/article/pii/S0743731516301198.

\* cited by examiner

700

COMPARE A STORAGE PARAMETER ASSOCIATED WITH STORAGE OF CHECKPOINT DATA TO A SPECIFIED STORAGE PARAMETER THRESHOLD
702

DETERMINE, BASED ON THE COMPARISON, WHETHER TO STORE THE CHECKPOINT DATA IN A HIGHER ORDER MEMORY TIER OR IN A LOWER ORDER MEMORY TIER
704

BASED ON A DETERMINATION THAT A VALUE OF THE STORAGE PARAMETER IS GREATER THAN OR EQUAL TO A VALUE OF THE SPECIFIED STORAGE PARAMETER THRESHOLD, STORE THE CHECKPOINT DATA IN THE LOWER ORDER MEMORY TIER
706

DETERMINE, BASED ON A COMPARISON OF A TRANSFER PARAMETER TO A SPECIFIED TRANSFER PARAMETER THRESHOLD, WHETHER TO TRANSFER THE CHECKPOINT DATA FROM A NODE-LOCAL STORAGE OF THE LOWER ORDER MEMORY TIER TO A PARALLEL FILE SYSTEM OF THE LOWER ORDER MEMORY TIER
708

*FIG. 7*

ADAPTIVE MULTI-LEVEL CHECKPOINTING

This invention was made with Government support under Prime Contract No. DE-AC52-07NA27344 awarded by Department of Energy (DOE). The Government has certain rights in this invention.

BACKGROUND

In computing systems, such as distributed computing systems, checkpointing may represent a technique to account for application failure. For example, if an application that is being executed were to fail, a latest checkpoint of the application may be used to continue the execution of the application. In this regard, instead of the need to restart the application from a beginning execution point of the application, a checkpoint may be used to ensure that execution of the application continues if failure were to occur beyond the checkpoint. The checkpoint may include all of the data needed to continue the execution of the application from a point of creation of the checkpoint, where such data may be copied from memory to persistent storage, and retrieved in the event of application failure.

BRIEF DESCRIPTION OF DRAWINGS

Features of the present disclosure are illustrated by way of example and not limited in the following figure(s), in which like numerals indicate like elements, in which:

FIG. 7 illustrates an example flowchart of a method for adaptive multi-level checkpointing.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Adaptive multi-level checkpointing apparatuses, methods for adaptive multi-level checkpointing, and non-transitory computer readable media having stored thereon machine readable instructions to provide adaptive multi-level checkpointing are disclosed herein. The apparatuses, methods, and non-transitory computer readable media disclosed herein provide for a decrease in checkpointing overhead by implementing adaptive checkpointing to guide the determination of a time to checkpoint and a location to checkpoint. In this regard, the determination of a time to checkpoint and a location to checkpoint may be performed, for example, by monitoring system performance of a system that is subject to checkpointing, and utilizing multi-level checkpointing as disclosed herein.

With respect to checkpointing, as high performance computing (HPC) systems are scaled, such systems may need relatively lower-overhead checkpointing schemes. Examples of checkpointing schemes include application level checkpointing, multi-level checkpointing, and other such checkpointing techniques.

Figure 2:
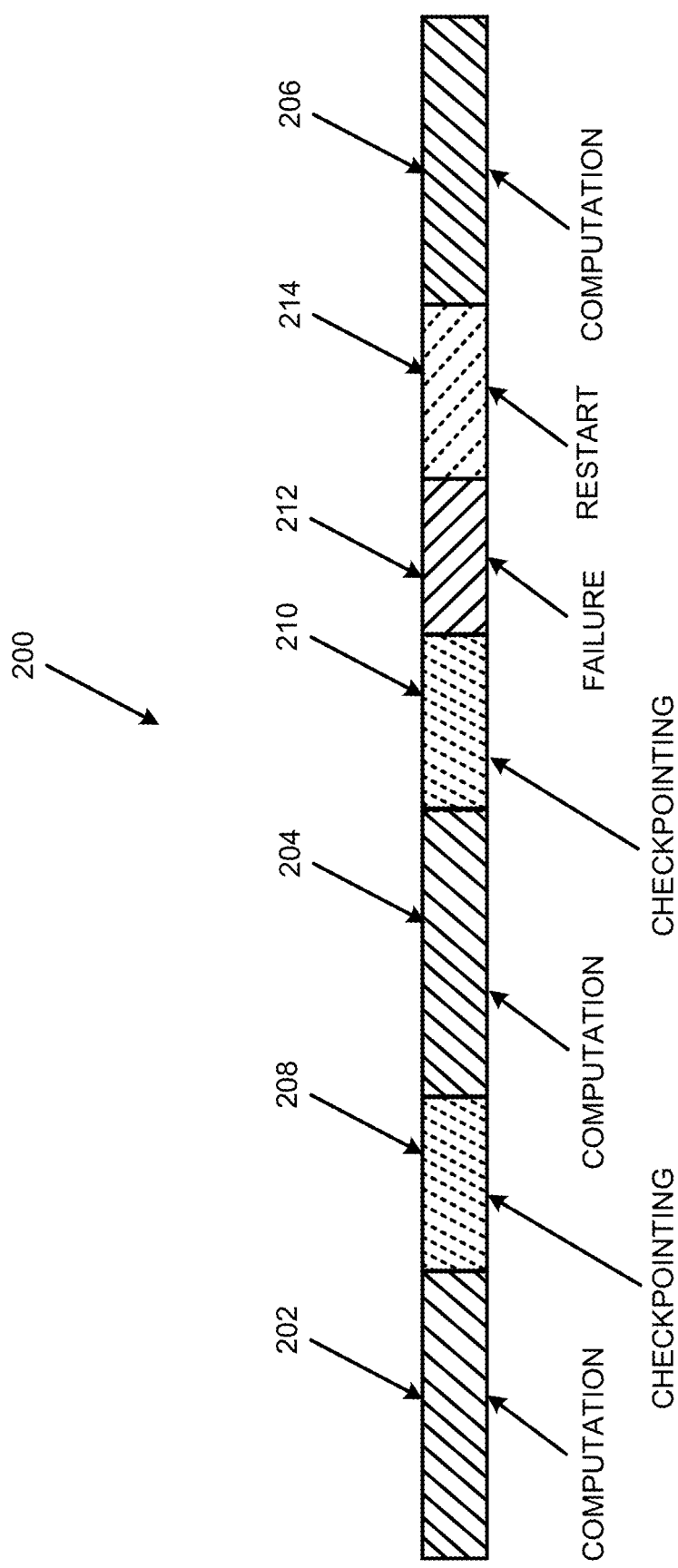
FIG. 2 illustrates an example of application level checkpointing to illustrate operation of the adaptive multi-level checkpointing apparatus of FIG. 1.

FIG. 2 illustrates an example of application level checkpointing 200 to illustrate operation of the apparatuses, methods, and non-transitory computer readable media disclosed herein. Referring to FIG. 2, locations 202, 204, and 206 may represent computation locations where an associated application is being executed, locations 208 and 210 may represent checkpointing locations, location 212 may represent a system failure location, and location 214 may represent a restart location. In this regard, upon the occurrence of a failure at location 212, the associated application may be restarted at location 214 based on the checkpoint at 204.

Compared to application level checkpointing, multi-level checkpointing that may provide relatively faster checkpointing by caching checkpoints in node-local storage of a storage hierarchy. For example, the storage hierarchy may include a relatively higher order memory tier that includes primary persistent memory, and a relatively lower order memory tier that includes a node-local storage and/or a parallel file system. In this regard, a snapshot of a state of an application may be written as a checkpoint to the higher order memory tier via parallel input/output. If a failure were to occur, the application may restore its state from data included in the checkpoint associated with the snapshot.

Examples of memory standards may include main memory (e.g., dynamic random-access memory (DRAM)), persistent memory (e.g., non-volatile dual in-line memory module (NVDIMM) that includes DRAM and flash memory), node-local storage (e.g., solid-state drive (SSD) or random-access memory (RAM) disk), and parallel file system (e.g., disk). Further, the parallel file system may represent a clustered input/output file system that allows multiple concurrent accesses.

Figure 3:
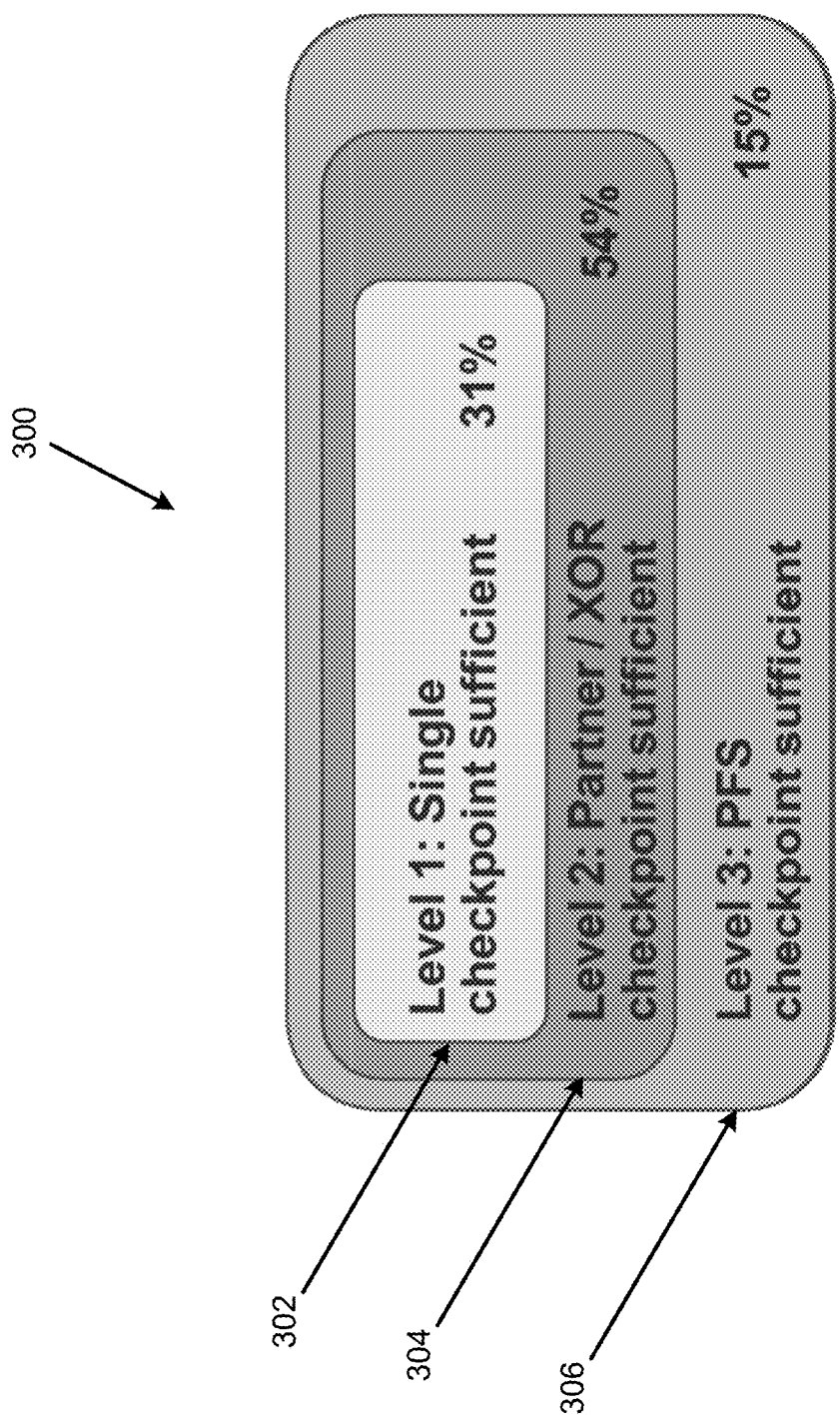
FIG. 3 illustrates an example of multi-level checkpointing to illustrate operation of the adaptive multi-level checkpointing apparatus of FIG. 1.
Figure 4:
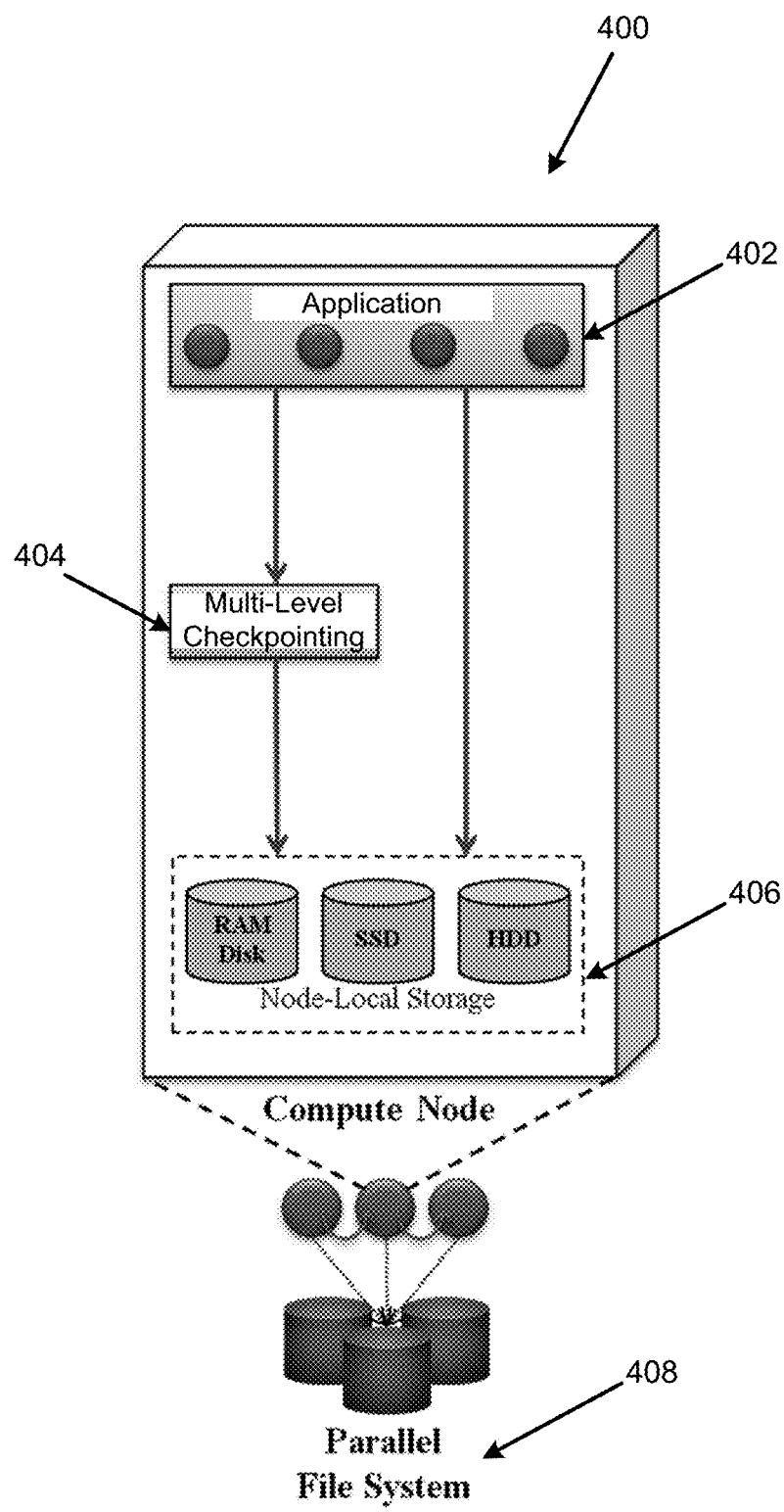
FIG. 4 illustrates an example of multi-level checkpointing to illustrate operation of the adaptive multi-level checkpointing apparatus of FIG. 1.

FIGS. 3 and 4 respectively illustrate examples 300 and 400 of multi-level checkpointing to illustrate operation of the apparatuses, methods, and non-transitory computer readable media disclosed herein. Referring to FIG. 3, at Level-1 at 302 of a high performance computing system, a single checkpoint may be performed, for example, where checkpoint data may be stored on a node's local storage.

At Level-2 at 304, a partner/XOR checkpoint may be performed. Compared to Level-1, the partner/XOR checkpointing at Level-2 may save copies of checkpoint data in the storage of other nodes in addition to saving the checkpoint data to local storage to increase resilience. In this regard, a node may also store its partner node's checkpoint data in its own local storage for increased resilience. That is, a copy of the checkpoint data may be stored in the storage of a "partner" node, in addition to storing the checkpoint data in the local storage. If a single node fails, the checkpoint data may be regenerated within Level-2. Further, for the XOR, checkpoint data may be written to local storage and small sets of nodes may compute and store redundancy data associated with the checkpoint. Thus, XOR checkpointing may store computed parity redundancy data in the storage of a small set of nodes.

At Level-3 at 306, a parallel file system checkpoint may be performed for stable storage of the checkpoint data. Compared to Level-1 and Level-2, for Level-3, checkpoint data may be stored in the parallel file system, may be shared by all nodes, and may be more resilient (e.g., protected by higher level of redundancy) compared to Level-1 and Level-2 since the checkpoint data may not become lost if a node failure occurs. The data in Level-2 may be assumed to be persistent, and is therefore not lost if the number of node failures is smaller than a projected threshold. Further, compared to Level-1 and Level-2, the parallel file system may be relatively slower, which may thus impact checkpointing performance.

For the example of FIG. 3, the example percentage values 31%, 54%, and 15% may represent the percentage of failures that may be recovered using that level of checkpointing over all failures. For example, Level-1 checkpointing may be sufficient to recover from 31% of the failures, Level-2 checkpointing may be sufficient to recover from 54% of the failures, and Level-3 checkpointing may be sufficient to recover from 15% of the failures. Thus, for maintaining resilience, the relatively faster Level-1 and Level-2 checkpointing may be utilized to recover from the majority of failures, without the use of the greater resiliency Level-3 checkpointing every time.

The different levels of FIG. 3 (e.g., Level-1, Level-2, and Level-3) may represent different specifications of checkpoint resiliency, with Level-1 representing a lowest level of checkpoint resiliency, and Level-3 represent a highest level of checkpoint resiliency. Referring to FIG. 4, for the application at 402, multi-level checkpointing may be performed at 404 to cache checkpoints in node-local storage at 406. In this example, the node-local storage at 406 of a lower order memory tier may include a RAM disk, an SSD, and a hard disk drive (HDD). Further, a parallel file system at 408 of the lower order memory tier may be utilized for checkpointing operations as disclosed herein.

For the examples of FIGS. 3 and 4, the Level-1 and Level-2 checkpoint data may be stored at node-local storage at 406, where multi-level checkpointing at 404 enables these levels. Further, the Level-3 checkpoint data may be stored at the parallel file system at 408.

For each checkpoint, the overhead of a checkpoint may be defined as a ratio of a time to take one checkpoint to a checkpoint interval (i.e., time between successive checkpoints). As high performance computing systems are scaled, the checkpointing overhead may continue to increase as the volume of data to be checkpointed is expected to increase with expanding memory capacities, which may negatively impact input/output bandwidth associated with such systems.

Multi-level checkpointing as disclosed herein may provide relatively low-overhead checkpointing by saving frequent checkpoints to a high-bandwidth storage (HBS) tier and flushing (e.g., transferring as disclosed herein) checkpoints onto a more resilient high-capacity storage (HCS) tier at less frequent intervals. The high-bandwidth storage tier may include node-local memory, partner-node memory, input/output nodes with relatively fast memory, etc. The high-capacity storage tier may include a parallel file system.

In multi-level checkpointing, a user may specify a transfer interval to transfer (e.g., flush) checkpoints to the parallel file system. In this regard, it is technically challenging to determine the transfer interval. For example, transferring too frequently may increase the utilization of both input/output and network bandwidth, which may cause interference with other traffic. Alternatively, transferring less frequently may increase the risk from node failure. Moreover, no one transfer frequency may be ideal for an application throughout its execution.

The apparatuses, methods, and non-transitory computer readable media disclosed herein may address the aforementioned technical challenges by providing a dynamic scheme to determine when to transfer checkpoints from a node-local storage to a parallel file system. Further, the apparatuses, methods, and non-transitory computer readable media disclosed herein may determine whether to store checkpoint data in a higher order memory tier or in a lower order memory tier.

According to examples, with respect to the determination of when to transfer checkpoints from a node-local storage to a parallel file system, the apparatuses, methods, and non-transitory computer readable media disclosed herein may implement adaptive checkpointing to enable transferring of checkpoints optimally in multi-level checkpointing implementations for large-scale high performance computing systems. In this regard, instead of transferring the checkpoints in node-local storage to a parallel file system in regular, pre-defined transfer intervals, the apparatuses, methods, and non-transitory computer readable media disclosed herein may monitor the system that is subject to checkpointing, and determine the best time and destination to checkpoint.

For example, in multi-level checkpointing, the transfer interval may be predetermined. The apparatuses, methods, and non-transitory computer readable media disclosed herein may utilize this predetermined interval as a starting point, and perform the actual transfer depending, for example, on factors such as input/output bandwidth availability. In this regard, the apparatuses, methods, and non-transitory computer readable media disclosed herein may include monitoring of the input/output and network traffic to determine when to transfer a local checkpoint to the parallel file system. For example, when the predetermined transfer interval is reached, monitoring of the input/output and network traffic may be performed, and checkpoint transfer may be performed when the network is not experiencing a surge.

For the apparatuses, methods, and non-transitory computer readable media disclosed herein, the relieving of the input/output bandwidth from the stress of checkpoint transfers may result in increased transfer speed due to the availability of additional input/output bandwidth.

According to examples, with respect to the determination of a location to checkpoint, in-memory checkpointing may enhance the performance of multi-level checkpointing by allocating a section of memory as a high-bandwidth storage tier. In this regard, allowing checkpoints to be saved in main or persistent memory may enable the performance of multi-level checkpointing for systems that do not include node-local storage. For cases in which a checkpoint does not fit the allocated memory region, the checkpoint may be "spilled" over to the next storage tier, whether it is a node-local storage or the parallel file system of a lower order memory tier. When memory usage is relatively high, in-memory checkpointing may pose additional pressure to memory bandwidth, which may negatively impact system performance.

In cases where in-memory checkpoint is implemented, the apparatuses, methods, and non-transitory computer readable media disclosed herein may include the determination of where to checkpoint, for example, according to factors such as memory bandwidth usage. In this regard, by leveraging the system status information, when memory usage is high and spill-overs are expected, the memory may be bypassed, and the checkpoint may be saved directly to the next tier storage to alleviate the memory bandwidth congestion, whether it is node-local storage or the parallel file system.

In examples described herein, module(s), as described herein, may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

Figure 1:
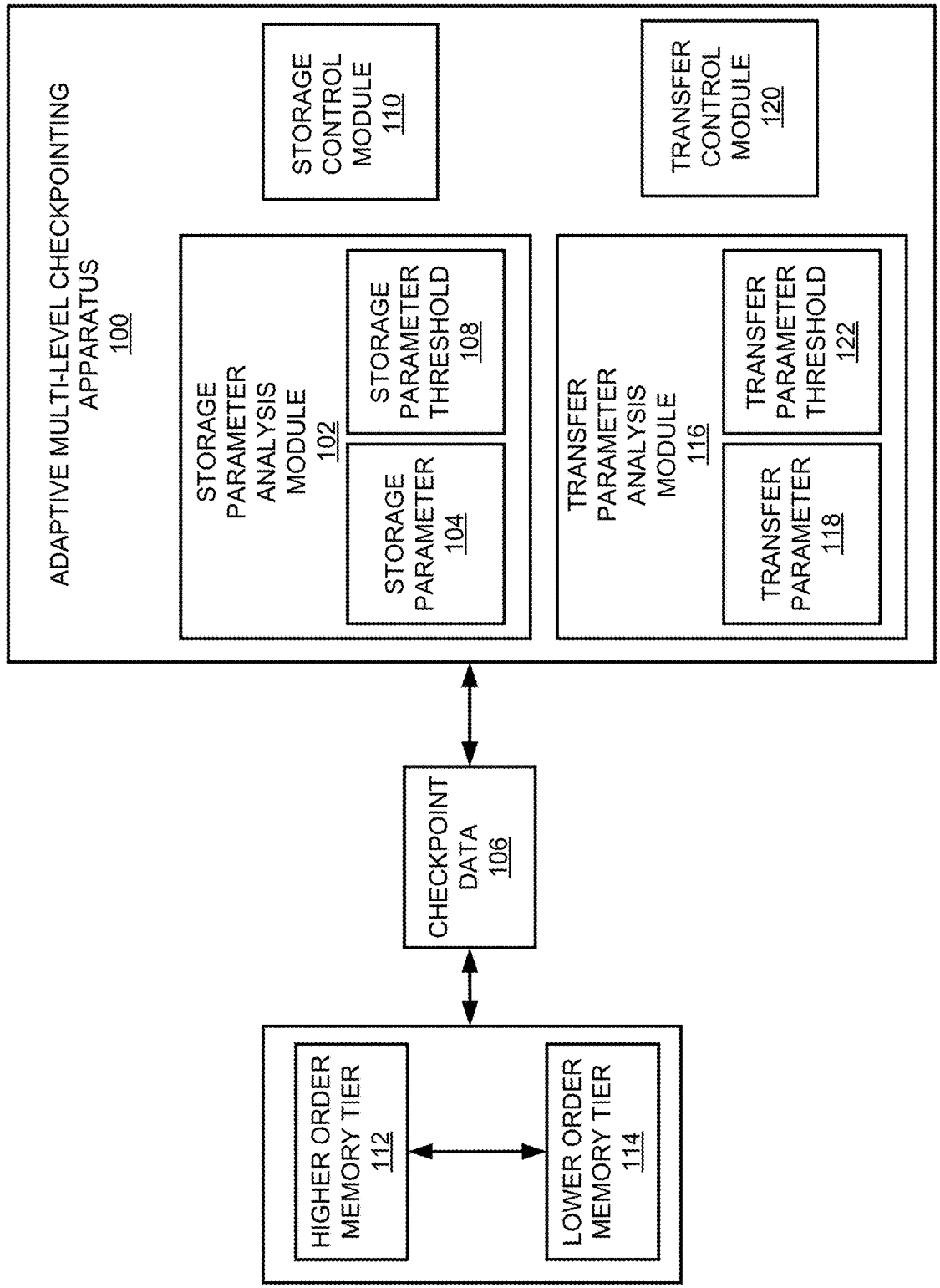
FIG. 1 illustrates an example layout of an adaptive multi-level checkpointing apparatus.

FIG. 1 illustrates an example layout of an adaptive multi-level checkpointing apparatus (hereinafter also referred to as "apparatus 100").

Referring to FIG. 1, with respect to determination of a location to checkpoint, the apparatus 100 may include a storage parameter analysis module 102 to compare a storage parameter 104 associated with storage of checkpoint data 106 to a specified storage parameter threshold 108.

A storage control module 110 may determine, based on the comparison, whether to store the checkpoint data 106 in a higher order memory tier 112 or in a lower order memory tier 114. The lower order memory tier 114 may be used, for example, upon the occurrence of spillover associated with the higher order memory tier 112.

According to examples, the storage parameter 104 may include memory bandwidth usage, and other such parameters associated with storage of the checkpoint data 106. With respect to memory bandwidth usage, assuming the peak memory bandwidth of a compute node is 128 GB/s, if performance counters on the compute node indicate that an application consumes 80% of the peak bandwidth (e.g., 102.4 GB/s), the priority of partner-node checkpointing may be lowered (e.g., the checkpoint data 106 may be stored in the lower order memory tier 114).

Based on a determination that a value of the storage parameter 104 is greater than or equal to a value of the specified storage parameter threshold 108, the storage control module 110 may store the checkpoint data 106 in the lower order memory tier 114. According to examples, a higher order memory tier may include a primary persistent memory, and the lower order memory tier may include a node-local storage and/or a parallel file system. In this regard, for in-memory checkpointing, the checkpoint data 106 may be stored in the primary persistent memory (or main memory) which may include a higher bandwidth compared to node-local storage or the parallel file system. As disclosed herein, examples of memory standards may include main memory (e.g., DRAM), persistent memory (e.g., NVDIMM that includes DRAM and flash memory), node-local storage (e.g., SSD or RAM disk), and parallel file system (e.g., disk).

According to another example, based on a determination that a value of the storage parameter 104 is greater than or equal to a value of the specified storage parameter threshold 108, the storage control module 110 may store a part of the checkpoint data 106 in the higher order memory tier according to a capacity of the higher order memory tier, and store a remaining part of the checkpoint data 106 in the lower order memory tier.

According to another example, based on a determination that a value of the storage parameter 104 is greater than or equal to a value of the specified storage parameter threshold 108, the storage control module 110 may store a part of the checkpoint data 106 in the higher order memory tier up to the specified storage parameter threshold 108, and store a remaining part of the checkpoint data 106 in the lower order memory tier.

Based on a determination that a value of the storage parameter 104 is less a value of the specified storage parameter threshold 108, the storage control module 110 may store the checkpoint data 106 in the higher order memory tier 112.

Figure 5:
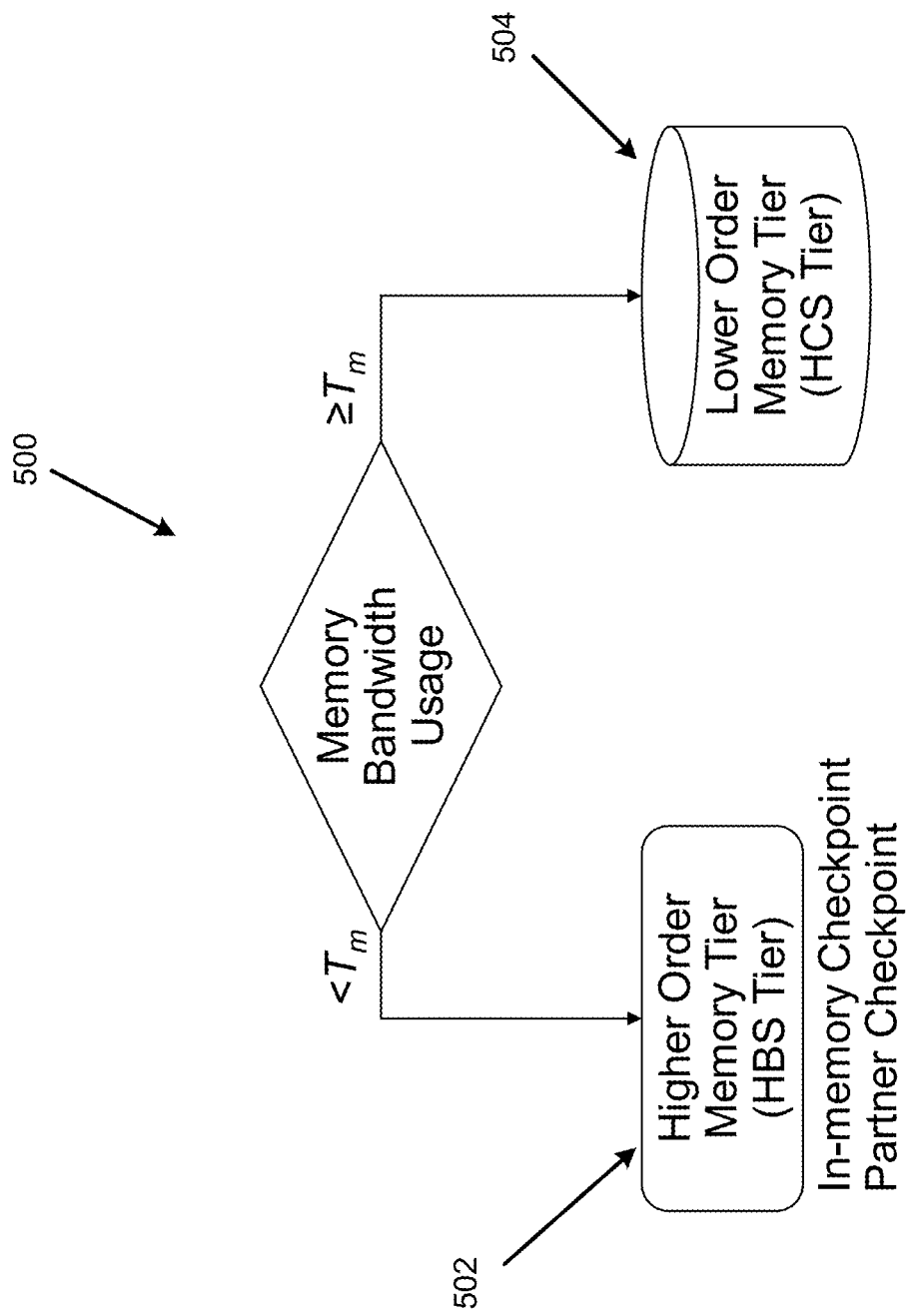
FIG. 5 illustrates an example layout to illustrate determination of a location to checkpoint with respect to the adaptive multi-level checkpointing apparatus of FIG. 1.

FIG. 5 illustrates an example layout 500 to illustrate determination of a location to checkpoint with respect to the apparatus 100.

Referring to FIGS. 1 and 5, for the storage parameter 104 that includes memory bandwidth usage as disclosed herein, if the memory bandwidth usage is less than a specified percentage (e.g., 20%) of available memory in each compute node, at 502, in-memory checkpointing and partner-node checkpointing (e.g., checkpointing to the higher order memory tier 112) may be implemented by default. Alternatively, according to an upper limit on the memory bandwidth usage threshold $T_m$, if the memory bandwidth usage is greater than or equal to the specified percentage (e.g., 20%) of available memory in each compute node, at 504, the checkpoint data 106 may be diverted to a next tier storage (e.g., the lower order memory tier 114). For the example of FIG. 5, the higher order memory tier 112 may represent a high-bandwidth storage tier, and the lower order memory tier may represent a high-capacity storage tier.

Yet further, if spill overs are expected, the performance benefits of the memory may be utilized by determining how much of the checkpoint data 106 may be saved to memory (e.g., the higher order memory tier 112) to utilize the memory capacity efficiently, up to the upper limit on memory usage threshold $T_m$. The rest of the checkpoint data 106 may again spill over to the next tier storage (e.g., the lower order memory tier 114).

Each data chunk of the checkpoint data 106 may include metadata that identifies which storage (e.g., the higher order memory tier 112, the lower order memory tier 114, etc.) includes the checkpoint data 106, and the location within the storage. Based on the metadata, the checkpoint data 106 may be tracked as to whether the checkpoint data 106 resides in memory (e.g., the higher order memory tier 112), in second tier storage (e.g., the lower order memory tier 114), and whether the checkpoint data 106 is subject to spill over.

Referring again to FIG. 1, with respect to determination of a time to checkpoint, a transfer parameter analysis module 116 may ascertain, for the checkpoint data 106 stored in node-local storage, a transfer parameter 118 associated with transfer of the checkpoint data from node-local storage of the lower order memory tier 114 to the parallel file system of the lower order memory tier 114.

According to examples, the transfer parameter 118 may include input/output bandwidth for an associated network, percentage disk idle time associated the node-local storage and/or the parallel file system, average queue length associated the node-local storage and/or the parallel file system, average latency to read from and write to the node-local storage and/or the parallel file system, and other such parameters associated with transfer of the checkpoint data 106. For example, the input/output bandwidth may be specified as 150 GB/s. According to an example, the percentage disk idle time may be specified as 70%. In this regard, a counter may be used to determine whether a disk is idle (e.g., where a counter value of 100 represents idle) or busy (e.g., where a counter value of 0 represents always busy). The counter may be operated at a specified frequency to increment between disk input/output requests. Every input/output request may reset the counter. For the example of the percentage disk idle time specified as 70%, a counter value of 70 may be used to ascertain a percentage disk idle time for the transfer parameter 118. According to another example, the average queue length may be specified as 60, where over a certain period of time (e.g., two hours), an average-average read queue length may be 10, and a maximum-average read queue length may be 60. According to another example, the average latency to read from and write to the node-local storage and/or the parallel file system may be specified as a factor such as 3*X ms, where an average read/write latency to disk may be specified as X ms measured by input/output monitoring software, and any value larger than 3*X ms may be considered as "high latency".

A transfer control module 120 may compare the transfer parameter 118 to a specified transfer parameter threshold 122. For example, the transfer parameter threshold 122 may be specified as a maximum allowed input/output bandwidth for an associated network, a maximum allowed percentage disk idle time associated the node-local storage and/or the parallel file system, a maximum allowed average queue length associated the node-local storage and/or the parallel file system, a maximum allowed average latency to read from and write to the node-local storage and/or the parallel file system, and other such parameters associated with transfer of the checkpoint data 106.

According to examples, the transfer control module 120 may determine a transfer interval associated with the transfer of the checkpoint data 106 from the node-local storage to the parallel file system. For example, the transfer interval may be specified as 0.5 ms, 1.0 ms, etc. Further, the transfer control module 120 may compare, before expiration of the transfer interval associated with the transfer of the checkpoint data 106 from the node-local storage to the parallel file system, the transfer parameter 118 to the specified transfer parameter threshold 122.

According to examples, the transfer control module 120 may compare, upon expiration of the transfer interval associated with the transfer of the checkpoint data 106 from the node-local storage to the parallel file system, the transfer parameter 118 to the specified transfer parameter threshold 122.

The transfer control module 120 determine, based on a comparison of the transfer parameter 118 to the specified transfer parameter threshold 122, whether to transfer the checkpoint data 106 from the node-local storage of the lower order memory tier 114 to the parallel file system of the lower order memory tier 114.

As disclosed herein, according to examples, the transfer parameter 118 may include input/output bandwidth, and other such parameters associated with transfer of the checkpoint data 106. In this regard, based on a determination that the input/output bandwidth is less than the specified input/output bandwidth threshold, the transfer control module 120 may cause the transfer of the checkpoint data 106 from the node-local storage to the parallel file system. Alternatively, based on a determination that the input/output bandwidth is greater than or equal to the specified input/output bandwidth threshold, the transfer control module 120 may delay the transfer of the checkpoint data 106 from the node-local storage to the parallel file system. For example, the transfer control module 120 may delay the transfer of the checkpoint data 106 until the associated network is no longer experiencing a surge (e.g., the input/output bandwidth is less than the specified input/output bandwidth threshold).

According to examples, the transfer parameter 118 may include percentage disk idle time, and other such parameters associated with transfer of the checkpoint data 106. In this regard, based on a determination that the percentage disk idle time is less than a specified percentage disk idle time threshold, the transfer control module 120 may cause the transfer of the checkpoint data from the node-local storage to the parallel file system. Alternatively, based on a determination that the percentage disk idle time is greater than or equal to the specified percentage disk idle time threshold, the transfer control module 120 may delay the transfer of the checkpoint data 106 from the node-local storage to the parallel file system. For example, the transfer control module 120 may delay the transfer of the checkpoint data 106 until the associated network is no longer experiencing a surge (e.g., the percentage disk idle time is less than the specified percentage disk idle time threshold).

For example, with respect to delay of the transfer of the checkpoint data 106 as disclosed herein, the transfer control module 120 may track the average read/write latency with respect to the node-local storage and the parallel file system, and if the average read/write latency value is in a downward trend, the transfer control module 120 may initiate the transfer of the checkpoint data 106.

The transfer control module 120 may initiate the transfer before a next transfer is needed (e.g., before a next transfer instruction is issued, for example, by an associated application). In this regard, assuming that the transfer interval (e.g., $T_f$) is known, the transfer control module 120 may force a transfer at time $T+T_f$ (where time $T+T_f$ is less than $2 \times T_f$) even if the input/output bandwidth is not too optimal. This ensures that a transfer is performed at approximately the transfer interval (e.g., time $T+T_f$), even if conditions are not optimal for the performance of a transfer.

Figure 6:
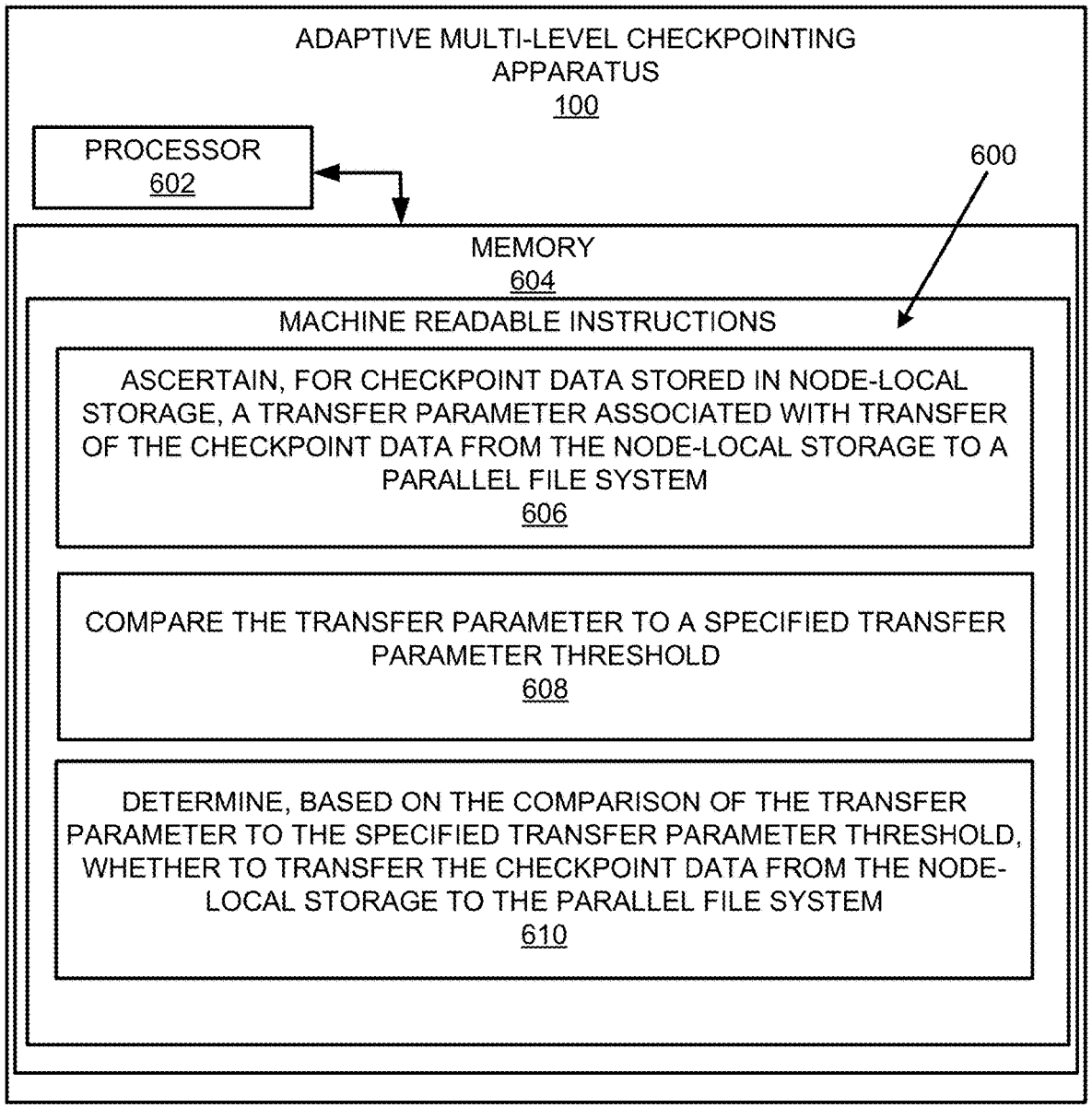
FIG. 6 illustrates an example block diagram for adaptive multi-level checkpointing.
Figure 8:
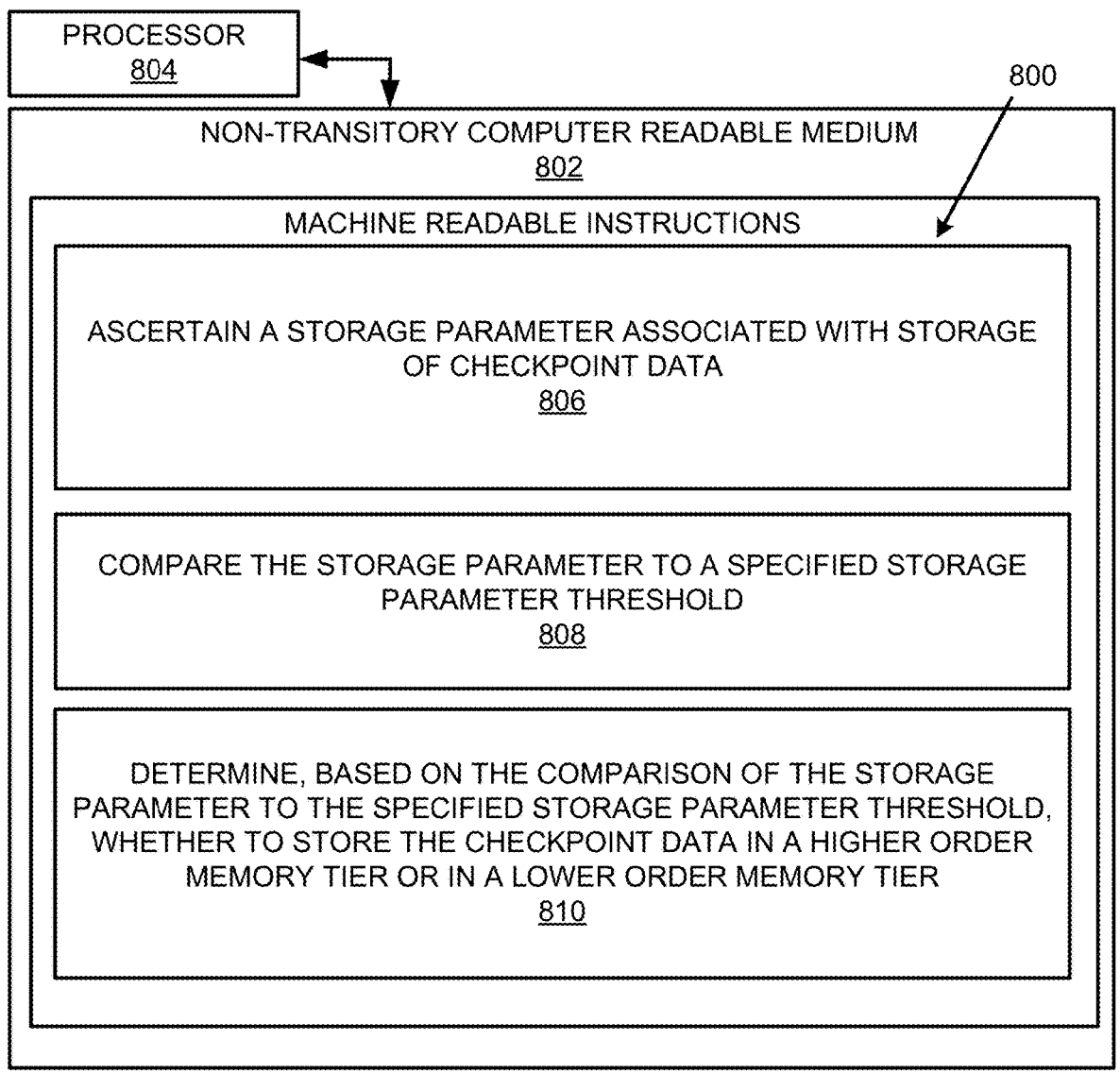
FIG. 8 illustrates a further example block diagram for adaptive multi-level checkpointing.

FIGS. 6-8 respectively illustrate an example block diagram 600, an example flowchart of a method 700, and a further example block diagram 800 for adaptive multi-level checkpointing. The block diagram 600, the method 700, and the block diagram 800 may be implemented on the apparatus 100 described above with reference to FIG. 1 by way of example and not limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 (i.e., a non-transitory computer readable medium) storing machine readable instructions that when executed by the processor 602 cause the processor to perform the instructions of the block diagram 600. The memory 604 may represent a non-transitory computer readable medium. FIG. 7 may represent a method for adaptive multi-level checkpointing. FIG. 8 may represent a non-transitory computer readable medium 802 having stored thereon machine readable instructions to provide adaptive multi-level checkpointing. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to ascertain, for checkpoint data 106 stored in node-local storage, a transfer parameter 118 associated with transfer of the checkpoint data 106 from the node-local storage to a parallel file system.

The processor 602 may fetch, decode, and execute the instructions 608 to compare the transfer parameter 118 to a specified transfer parameter threshold 122.

The processor 602 may fetch, decode, and execute the instructions 610 to determine, based on the comparison of the transfer parameter 118 to the specified transfer parameter threshold 122, whether to transfer the checkpoint data 106 from the node-local storage to the parallel file system.

Referring to FIGS. 1-5 and 7, and particularly FIG. 7, for the method 700, at block 702, the method may include comparing a storage parameter 104 associated with storage of checkpoint data 106 to a specified storage parameter threshold 108.

At block 704 the method may include determining, based on the comparison, whether to store the checkpoint data 106 in a higher order memory tier 112 or in a lower order memory tier 114. The lower order memory tier 114 may be used upon occurrence of spillover associated with the higher order memory tier 112.

At block 706, based on a determination that a value of the storage parameter 104 is greater than or equal to a value of the specified storage parameter threshold 108, the method may include storing the checkpoint data 106 in the lower order memory tier 114.

At block 708 the method may include determining, based on a comparison of a transfer parameter 118 to a specified transfer parameter threshold 122, whether to transfer the checkpoint data 106 from a node-local storage of the lower order memory tier 114 to a parallel file system of the lower order memory tier 114.

Referring to FIGS. 1-5 and 8, and particularly FIG. 8, for the block diagram 800, the non-transitory computer readable medium 802 may include instructions 806 to ascertain a storage parameter 104 associated with storage of checkpoint data 106.

The processor 804 may fetch, decode, and execute the instructions 808 to compare the storage parameter 104 to a specified storage parameter threshold 108.

The processor 804 may fetch, decode, and execute the instructions 810 to determine, based on the comparison of the storage parameter 104 to the specified storage parameter threshold 108, whether to store the checkpoint data 106 in a higher order memory tier 112 or in a lower order memory tier 114. The lower order memory tier 114 may be used upon occurrence of spillover associated with the higher order memory tier 112.

What has been described and illustrated herein is an example along with some of its variations. The terms, descriptions and figures used herein are set forth by way of illustration and are not meant as limitations. Many variations are possible within the spirit and scope of the subject matter, which is intended to be defined by the following claims— and their equivalents—in which all terms are meant in their broadest reasonable sense unless otherwise indicated.

What is claimed is:

1. An apparatus comprising:
a processor; and
a non-transitory computer readable medium storing machine readable instructions that when executed by the processor cause the processor to:
   ascertain, for checkpoint data stored in node-local storage, a transfer parameter associated with transfer of the checkpoint data from the node-local storage to a parallel file system;
   compare the transfer parameter to a specified transfer parameter threshold
   determine, based on the comparison of the transfer parameter to the specified transfer parameter threshold, whether to transfer the checkpoint data from the node-local storage to the parallel file system, wherein the transfer parameter includes input/output bandwidth or a percentage disk idle time; and
   where the transfer parameter includes the input/output bandwidth, based on a determination that the input/output bandwidth is less than the specified input/output bandwidth threshold, cause the transfer of the checkpoint data from the node-local storage to the parallel file system; or
   where the transfer parameter includes the percentage disk idle time, based on a determination that the percentage disk idle time is less than the specified percentage disk idle time threshold, cause the transfer of the checkpoint data from the node-local storage to the parallel file system.

2. The apparatus according to claim 1, wherein the instructions to compare the transfer parameter to the specified transfer parameter threshold are further to cause the processor to:
   determine a transfer interval associated with the transfer of the checkpoint data from the node-local storage to the parallel file system; and
   compare, before expiration of the transfer interval associated with the transfer of the checkpoint data from the node-local storage to the parallel file system, the transfer parameter to the specified transfer parameter threshold.

3. The apparatus according to claim 1, wherein the instructions to compare the transfer parameter to the specified transfer parameter threshold are further to cause the processor to:
   determine a transfer interval associated with the transfer of the checkpoint data from the node-local storage to the parallel file system; and
   compare, upon expiration of the transfer interval associated with the transfer of the checkpoint data from the node-local storage to the parallel file system, the transfer parameter to the specified transfer parameter threshold.

4. The apparatus according to claim 1, wherein the transfer parameter includes the input/output bandwidth.

5. The apparatus according to claim 1, wherein the instructions to determine, based on the comparison of the input/output bandwidth to the specified input/output bandwidth threshold, whether to transfer the checkpoint data from the node-local storage to the parallel file system are further to cause the processor to:
based on a determination that the input/output bandwidth is greater than or equal to the specified input/output bandwidth threshold, delay the transfer of the checkpoint data from the node-local storage to the parallel file system.

6. The apparatus according to claim 1, wherein the transfer parameter includes the percentage disk idle time.

7. A computer implemented method comprising:
comparing a storage parameter associated with storage of checkpoint data to a specified storage parameter threshold;
determining, based on the comparison, whether to store the checkpoint data in a higher order memory tier or in a lower order memory tier, wherein the lower order memory tier is to be used upon occurrence of spillover associated with the higher order memory tier;
based on a determination that a value of the storage parameter is greater than or equal to a value of the specified storage parameter threshold, storing the checkpoint data in the lower order memory tier; and
determining, based on a comparison of a transfer parameter to a specified transfer parameter threshold, whether to transfer the checkpoint data from a node-local storage of the lower order memory tier to a parallel file system of the lower order memory tier.

8. The computer implemented method according to claim 7, wherein the storage parameter includes memory bandwidth usage, further comprising:
based on a determination that the memory bandwidth usage is less than the specified memory bandwidth usage threshold, storing the checkpoint data in the higher order memory tier.

9. The computer implemented method according to claim 7, wherein the higher order memory tier includes a primary persistent memory, and the lower order memory tier includes a node-local storage or a parallel file system.

10. The computer implemented method according to claim 7, further comprising:
determining a transfer interval associated with the transfer of the checkpoint data from the node-local storage to the parallel file system; and
comparing, upon expiration of the transfer interval associated with the transfer of the checkpoint data from the node-local storage to the parallel file system, the transfer parameter to the specified transfer parameter threshold.

11. The computer implemented method according to claim 7, further comprising:
determining a transfer interval associated with the transfer of the checkpoint data from the node-local storage to the parallel file system; and
comparing, before expiration of the transfer interval associated with the transfer of the checkpoint data from the node-local storage to the parallel file system, the transfer parameter to the specified transfer parameter threshold.

12. A non-transitory computer readable medium having stored thereon machine readable instructions, the machine readable instructions, when executed, cause a processor to:
ascertain a storage parameter associated with storage of checkpoint data;
compare the storage parameter to a specified storage parameter threshold; and
determine, based on the comparison of the storage parameter to the specified storage parameter threshold, whether to store the checkpoint data in a higher order memory tier or in a lower order memory tier, wherein the lower order memory tier is to be used upon occurrence of spillover associated with the higher order memory tier.

13. The non-transitory computer readable medium according to claim 12, wherein the storage parameter includes memory bandwidth usage.

14. The non-transitory computer readable medium according to claim 13, wherein the machine readable instructions, when executed, further cause the processor to:
based on a determination that the memory bandwidth usage is less than the specified memory bandwidth usage threshold, store the checkpoint data in the higher order memory tier.

15. The non-transitory computer readable medium according to claim 13, wherein the machine readable instructions, when executed, further cause the processor to:
based on a determination that the memory bandwidth usage is greater than or equal to the specified memory bandwidth usage threshold, store the checkpoint data in the lower order memory tier.

16. The non-transitory computer readable medium according to claim 12, wherein the higher order memory tier includes a primary persistent memory, and the lower order memory tier includes a node-local storage or a parallel file system.

17. The non-transitory computer readable medium according to claim 13, wherein the machine readable instructions, when executed, further cause the processor to:
based on a determination that the memory bandwidth usage is greater than or equal to the specified memory bandwidth usage threshold,
store a part of the checkpoint data in the higher order memory tier according to a capacity of the higher order memory tier, and
store a remaining part of the checkpoint data in the lower order memory tier.

18. The non-transitory computer readable medium according to claim 13, wherein the machine readable instructions, when executed, further cause the processor to:
based on a determination that the memory bandwidth usage is greater than or equal to the specified memory bandwidth usage threshold,
store a part of the checkpoint data in the higher order memory tier up to the specified memory bandwidth usage threshold, and
store a remaining part of the checkpoint data in the lower order memory tier.

* * * * *